US 12,095,392 B2

United States Patent
Wang et al.

(10) Patent No.: US 12,095,392 B2
(45) Date of Patent: Sep. 17, 2024

(54) CONTROL METHOD OF DUAL THREE-PHASE PERMANENT MAGNET SYNCHRONOUS MOTOR BY ALTERNATELY PERFORMING SAMPLING AND CONTROL PROCEDURES

(71) Applicant: SOUTHEAST UNIVERSITY, Jiangsu (CN)

(72) Inventors: Zheng Wang, Jiangsu (CN); Minrui Gu, Jiangsu (CN)

(73) Assignee: SOUTHEAST UNIVERSITY, Jiangsu (CN)

( * ) Notice: Subject to any disclaimer, the term of this patent is extended or adjusted under 35 U.S.C. 154(b) by 282 days.

(21) Appl. No.: 17/629,243

(22) PCT Filed: Apr. 20, 2021

(86) PCT No.: PCT/CN2021/088487
§ 371 (c)(1),
(2) Date: Jan. 21, 2022

(87) PCT Pub. No.: WO2022/151609
PCT Pub. Date: Jul. 21, 2022

(65) Prior Publication Data
US 2023/0006582 A1 Jan. 5, 2023

(30) Foreign Application Priority Data
Jan. 12, 2021 (CN) .......................... 202110034890.8

(51) Int. Cl.
H02P 21/00 (2016.01)
H02K 11/33 (2016.01)
(Continued)

(52) U.S. Cl.
CPC .......... *H02P 21/0017* (2013.01); *H02K 11/33* (2016.01); *H02P 21/18* (2016.02); *H02P 25/022* (2013.01); *H02K 2213/03* (2013.01)

(58) Field of Classification Search
CPC .... H02P 21/0017; H02P 21/18; H02P 25/022; H02P 21/22; H02P 25/22; H02P 21/0003;
(Continued)

(56) References Cited
U.S. PATENT DOCUMENTS 8,421,386 B2 * 4/2013 Takahashi ............... H02P 21/20
318/400.03
10,465,965 B2 * 11/2019 Yamakawa ............. F04B 35/04

FOREIGN PATENT DOCUMENTS

CN 101587502 A 11/2009
CN 108123650 A 6/2018
(Continued)

OTHER PUBLICATIONS

JP-2018110481-A Machine Translation (Year: 2018).*
(Continued)

Primary Examiner — David Luo
(74) Attorney, Agent, or Firm — MUNCY, GEISSLER, OLDS & LOWE, PC

(57) ABSTRACT

In a control method of a dual three-phase permanent magnet synchronous motor by alternately performing sampling and control procedures, sampling instants, vector loading instants, and reference value tracking instants of two sets of windings alternate in two halves of a sampling period, and the equivalent sampling frequency of the motor drive system is doubled and the digital delay and the predictive horizon are halved without changing the sampling frequency of a single set of three-phase windings. In addition, by a two-layer MPC strategy, a deficient-rank problem is settled that the controlled dimensionality of the system is reduced to two (Continued)

dimensions but the motor control objective is still four dimensions caused by the method with controlling a dual three-phase permanent magnet synchronous motor by alternately performing sampling and control procedures.

9 Claims, 19 Drawing Sheets

(51) Int. Cl.
    *H02P 21/18*     (2016.01)
    *H02P 25/022*     (2016.01)

(58) Field of Classification Search
    CPC ......... H02P 21/14; H02P 27/12; H02K 11/33; H02K 2213/03; H02M 1/0009; H02M 7/53876

USPC ............................................ 318/400.01, 700
See application file for complete search history.

(56) References Cited

FOREIGN PATENT DOCUMENTS

| CN | 111817627 A | | 10/2020 | |
|----|-------------|---|---------|---|
| JP | 2018110481 A | * | 7/2018 | ............. Y02T 10/72 |
| JP | 2020034046 A | | 3/2020 | |

OTHER PUBLICATIONS

Jian et al., "Vector Control for Dual Three-Phase PMSG and Digital Implementation," Electric Machines and Control, Apr. 30, 2013, vol. 17, No. 4, pp. 50-63.

* cited by examiner

CONTROL METHOD OF DUAL THREE-PHASE PERMANENT MAGNET SYNCHRONOUS MOTOR BY ALTERNATELY PERFORMING SAMPLING AND CONTROL PROCEDURES

TECHNICAL FIELD

The present invention relates to electrical engineering, motor, and power electronics technologies, and in particular, to a control method of a dual three-phase permanent magnet synchronous motor by alternately performing sampling and control procedures, which belongs to the field of power generation, power transformation or power distribution technologies.

BACKGROUND

In recent years, in the field of medium-voltage high-power applications, multilevel multiphase motor drive systems have attracted increasing attention due to the advantages such as low stress of power devices, high reliability, and high-power quality. The dual three-phase permanent magnet synchronous motor drive system is very promising by virtue of advantages such as the simple structure, 6th torque ripple elimination, and high fault tolerant capability. To improve the efficiency of power electronic converters and reduce the capacity of the auxiliary heat-dissipation system, the switching frequency of power devices in medium-voltage high-power applications is usually less than 1 kHz. Because of the low switching frequency, existing vector control based on a proportional-integral (PI) controller has the following problems: (1) The low-switching-frequency operation intensifies the influence of the delay effect in digital control. The coupling effect of motor dq-axis component is intensified. The method of conventional first-order inertial modeling has a large error. As a result, the steady-state and dynamic control performance of the motor drive system is significantly affected. (2) The low switching frequency operation leads to an increase in the output harmonic components of the power electronic converter, resulting in degraded control performance. (3) The large delay effect caused by the low switching frequency reduces the bandwidth of the conventional vector control system, affecting the stability of the control system. The dual three-phase motor drive system has two sets of three-phase windings and power electronic converters, and has higher control degrees of freedom than the conventional three-phase motor drive system, providing the optimization room to improve the control performance. This application aims to overcome the shortcomings of the existing control methods with the low-switching-frequency operation by alternately performing sampling and control procedures of the dual three-phase permanent magnet synchronous motor drive systems.

SUMMARY

An objective of the present invention is to provide a control method of a dual three-phase permanent magnet synchronous motor by alternately performing sampling and control procedures for deficiencies in the BACKGROUND. Sampling and control procedures of the two sets of three-phase windings and corresponding power electronic converters are performed alternately so that the overall equivalent sampling frequency of the motor drive system is doubled without changing the sampling frequency of a single set of three-phase windings. Therefore, the steady-state and dynamic control performance of the motor drive system with low switching frequencies is improved effectively, and the problems of the delay effect and degraded control performance are settled in the existing control methods with low switching frequencies.

To achieve the foregoing inventive objectives, the present invention adopts the technical solutions as follows:

A control method of a dual three-phase permanent magnet synchronous motor by alternately performing sampling and control procedures includes the following steps:

1) respectively acquiring and calculating the value of a rotating speed, the values of phase currents, and the value of mid-point voltage in the DC link by using a position encoder, phase current sensors, and DC-link voltage sensors, and obtaining values of $d_1q_1$-axis currents and $d_2q_2$-axis currents of the dual three-phase PMSM by using the dual synchronous coordinate transformation module;

2) performing a first-order forward Euler discretization on the mathematical model of the motor, and obtaining the sampling values of the $d_1q_1$-axis currents, the $d_2q_2$-axis currents, and the value of DC-link mid-point voltage where the delay effect has been compensated;

3) calculating torque reference values with the closed-loop control of a machine speed, obtaining and equally dividing reference values of dq-axis currents based on a vector control method to obtain reference values of the $d_1q_1$-axis currents and the $d_2q_2$-axis currents;

4) calculating $d_1q_1$-axis reference voltage vectors and $d_2q_2$-axis reference voltage vectors based on a deadbeat control principle along with the reference values and the sampling values of the $d_1q_1$-axis currents and the $d_2q_2$-axis currents;

5) selecting, in combination with the distribution characteristic of voltage space vectors of three-level inverters, four or five voltage vectors of a triangular sector in which the $d_1q_1$-axis reference voltage vectors and the $d_2q_2$-axis reference voltage vectors are located as candidate vectors for model predictive control (MPC);

6) predicting control performance of the candidate vectors in step 5) based on discrete models of the motor and the inverter, and selecting a candidate vector with an optimal control performance according to the cost function as the final loaded vector.

Furthermore, the vector candidates causing the switch transition between P level and N level are required to be disqualified. If the candidate vectors in step 5) are all disqualified, voltage vectors in a hexagonal sector are selected as new candidate vectors. Vectors that do not cause the switch transition between the P level and the N level is selected from the new candidate vectors as a final candidate vector.

Furthermore, the cost function in step 6) includes two cases: In the first case, there is at least one candidate vector with which the predicted values of all controlled variables are within predefined error bounds. The trajectories of the controlled variables are linearly extrapolated. When the trajectory reaches the error bound, the extrapolation process is ended. An average switching frequency is calculated based on an extrapolation length and the number of switching actions generated by a switch transition to the candidate vector. The average switching frequency is used as the cost function. In the second case, if no candidate vector satisfies the condition of the first case, the weighting factor-based method where the absolue control errors of the controlled variables are summarized with corresponding weighting factors is used to construct the cost function.

Furthermore, procedures of selecting and evaluating the candidate vectors in step 4), step 5), and step 6) are alternately performed in the two sets of windings. When a sampling procedure is performed in the first set of windings, new vectors are loaded in the second set of windings, and a switching state corresponding to the second set of windings remains unchanged until the next sampling procedure is performed in the first set of windings. When the sampling procedure is performed in the second set of windings, new vectors are loaded in the first set of windings, and a switching state corresponding to the first set of windings remains unchanged until the next sampling procedure is performed in the second set of windings. To resolve the deficient-rank problem caused by the control method by alternately performing sampling and control procedures, a two-layer MPC scheme is adopted in step 4), step 5), and step 6). The four-dimensional control objective is divided into two layers. Step 4) and step 5) form the first-layer MPC. Control objectives of the deadbeat control in the first-layer MPC are that the $d_1q_1$-axis currents and the $d_2q_2$-axis currents track the equally divided reference current values. Step 6) is second-layer MPC. Control targets of the second-layer MPC are the d-axis total current and q-axis total current of a dual three-phase PMSM, and the control objective of the second-layer MPC is to make the d-axis total current and the q-axis total current of the dual three-phase PMSM follow the reference values of the d-axis total current and q-axis total current that is obtained by a maximum torque per ampere control module.

The foregoing technical solution adopted by the present invention has the following beneficial effects:

(1) The present invention doubles the equivalent sampling frequency of a motor drive system and halves a digital delay by using a control method by alternately performing sampling and control procedures. In addition, the whole prediction horizon of candidate vectors in an MPC scheme is halved, and thus the prediction accuracy is improved. Therefore, the steady-state and dynamic control performance of the motor drive system is improved effectively.

(2) The present invention reduces the dimensionality of the motor drive system from four dimensions to two dimensions by using the control method by alternately performing sampling and control procedures, thereby effectively reducing the computation burden of the MPC scheme.

(3) In the present invention, a two-layer MPC strategy is used. In the first-layer MPC, equally divided reference current values are used as the control objective to determine candidate vectors. Therefore, the selected candidate vectors can ensure that currents of the two sets of three-phase windings are divided equally. In the second-layer MPC, the control objective that a d-axis total current and a q-axis total current follow reference values is used to select a final loaded vector from candidate vectors. Consequently, it is achieved that the control of the d-axis total current and the q-axis total current is realized while ensuring that the currents of the two sets of windings are divided equally. Therefore, the deficient-rank problem is settled that the controllable dimensionality of the system is reduced to two dimensions but the control objective is still four dimensions in the control method by alternately performing sampling and control procedures, and the implementation of the control of a four-dimensional control objective by using two-dimensional controlled amounts is achieved.

(4) With the control method of a dual three-phase permanent magnet synchronous motor by alternately performing sampling and control procedures of the present invention, the equivalent sampling frequency of the motor drive system is increased, and the control delay is shortened, thereby effectively resolving the problem of low control accuracy caused by the long control delay in conventional control methods with low switching frequencies.

DETAILED DESCRIPTION

The inventive concept of the present invention is further described below with reference to the accompanying drawings and specific embodiments. It should be understood that these embodiments are merely used for describing the present invention rather than limiting the scope of the present invention. After reading the present invention, any equivalent modification made by a person skilled in the art shall fall within the scope defined by the appended claims of this application.

The present invention provides a control method of a dual three-phase permanent magnet synchronous motor by alternately performing sampling and control procedures. To improve the control performance of the motor drive system with low switching frequencies, the present invention doubles the equivalent sampling frequency of the motor drive system by alternately performing sampling and control procedures of the dual three-phase windings and corresponding converters without changing the sampling frequency of a single set of three-phase windings. Therefore, the steady-state and dynamic control performance of the motor drive system with low switching frequencies is improved effectively.

Figure 1:
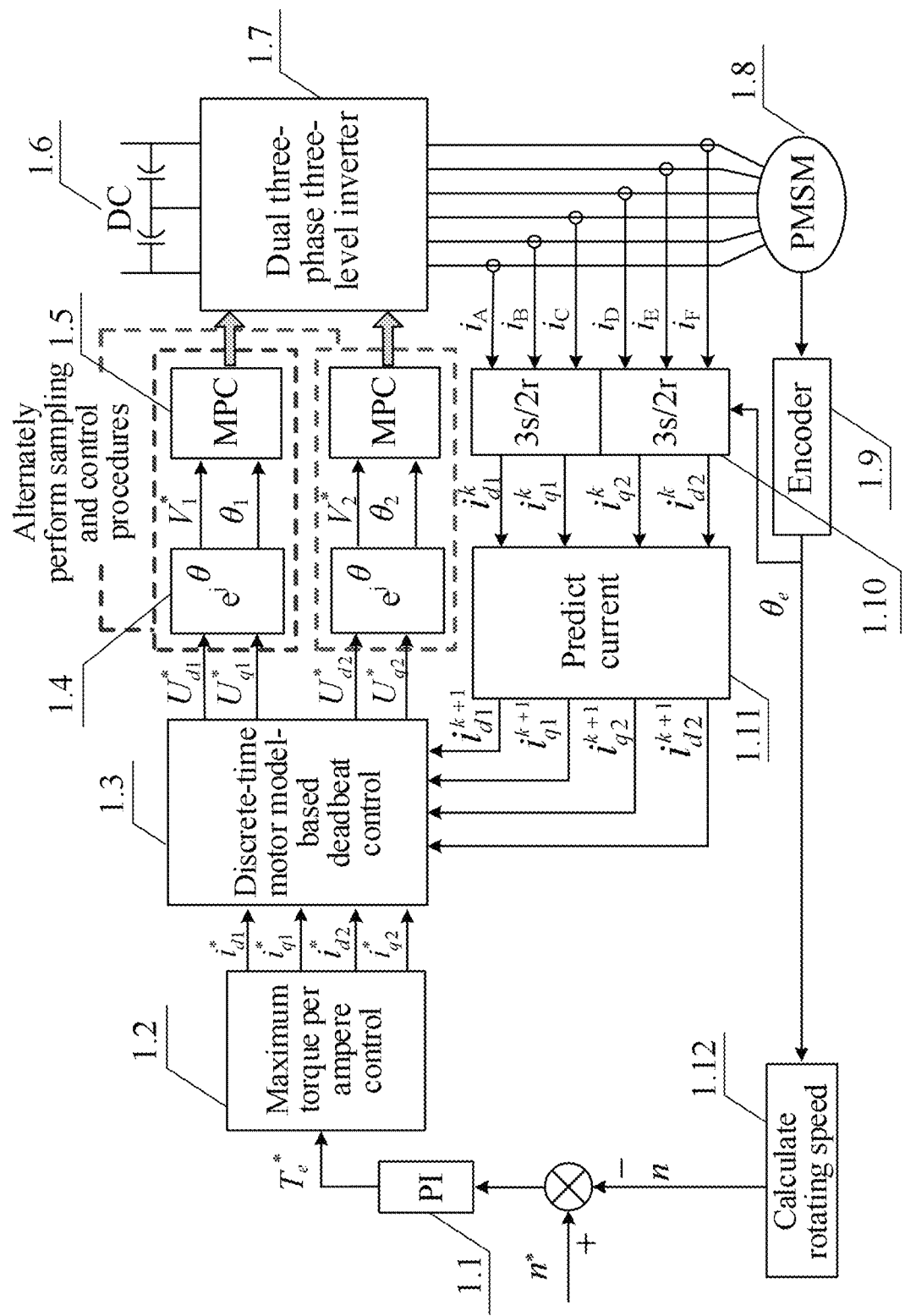
FIG. 1 is a block diagram of multi-step MPC of a dual three-phase permanent magnet synchronous motor by alternately performing sampling and control procedures, where 1.1 is a PI controller used in closed-loop speed control, 1.2 is a maximum torque per ampere control module, 1.3 is a discrete-time motor model-based deadbeat control module, 1.4 is a polar coordinate transformation module, 1.5 is a multi-step MPC module, 1.6 is the DC link, 1.7 is a dual three-phase three-level inverter, 1.8 is a dual three-phase permanent magnet synchronous motor, 1.9 is a position encoder, 1.10 is a dual synchronous coordinate transformation module, 1.11 is a current prediction module, and 1.12 is a speed calculation module.

For a system for controlling a dual three-phase permanent magnet synchronous motor under a low switching frequency condition, the present invention provides a multi-step model predictive control scheme of alternately performing sampling and control procedures. The scheme of the control method by alternately performing sampling and control procedures is shown in FIG. 1. The control system includes a speed PI controller 1.1, a maximum torque per ampere control module 1.2, a discrete-time motor model-based deadbeat control module 1.3, a polar coordinate transformation module 1.4, a multi-step MPC module 1.5, the DC link 1.6, a dual three-phase three-level inverter 1.7, a dual three-phase permanent magnet synchronous motor 1.8, a position encoder 1.9, a dual synchronous coordinate transformation module 1.10, a current prediction module 1.11, and a speed calculation module 1.12. The position encoder 1.9 mounted on an output shaft of the dual three-phase permanent magnet synchronous motor 1.8 is configured to detect an angular position $\theta_e$ of the motor. The speed calculation module 1.12 calculates a rotating speed n according to the angular position $\theta_e$, and feeds the difference between the rotating speed n and the reference value n* into the speed PI controller 1.1. The speed PI controller 1.1 generates the torque reference value $T_e$*. Then the maximum torque per ampere control module 1.2 generates dq-axis reference currents according to the torque reference $T_e$*. Equal division is performed to obtain reference values $i_{d1}$* and $i_{q1}$* of dq-axis currents of the first set of windings and reference values $i_{d2}$* and $i_{q2}$* of dq-axis currents of the second set of windings. Six-phase currents $i_A$, $i_B$, $i_C$, $i_D$, $i_E$, and $i_F$ obtained by sampling circuits are processed by the dual synchronous coordinate transformation module 1.10 to obtain dq-axis currents $i_{d1}^k$, $i_{q1}^k$, $i_{d2}^k$, and $i_{q2}^k$ of two sets of windings at instant $kT_s$ in the dual synchronous coordinate system. Then the current prediction module 1.11 compensates for the digital delay. Values of dq-axis currents $i_{d1}^{k+1}$, $i_{q1}^{k+1}$, $i_{d2}^{k+1}$ and $i_{q2}^{k+1}$ and DC-link mid-point voltage $V_n^{k+1}$ at the next instant $(k+1)T_s$ are predicted. According to the reference values of the currents and predicted values of the currents, the discrete-time motor model-based deadbeat control module 1.3 calculates reference voltages $U_{d1}$* and $U_{q1}$* of the first set of windings and reference voltages $U_{d2}$* and $U_{q2}$* of the second set of windings according to the reference values of the currents and predicted values of the currents. The polar coordinate transformation module 1.4 and the multi-step MPC module 1.5 determine the final loaded vector. Consequently, the dual three-phase three-level inverter 1.7 is controlled to implement the control algorithm for the dual three-phase permanent magnet synchronous motor 1.8.

Figure 2:
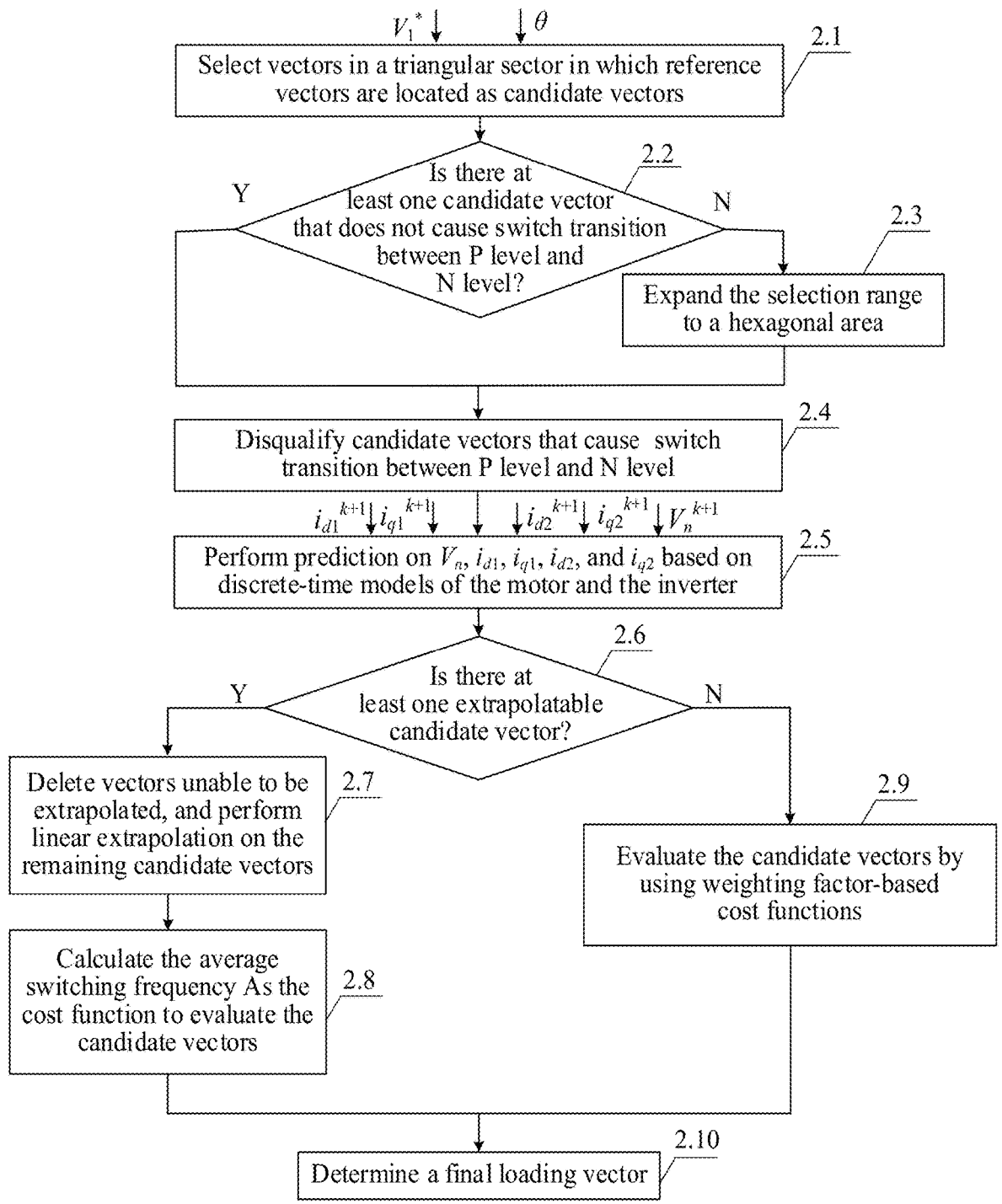
FIG. 2 is a flowchart of a multi-step MPC method.

In a multi-step MPC method by alternately performing sampling and control procedures of the present invention, a specific procedure of determining a loaded the vector by the multi-step model predictive control module is shown in FIG. 2, and includes the following steps.

Step 2.1: Select, according to results of the polar coordinate transformation of reference voltages $U_{d1}$* and $U_{q1}$* of the first set of windings and reference voltages $U_{d2}$* and $U_{q2}$* of the second set of windings, vectors in a triangular sector in which reference voltage vectors of an corresponding inverter are located as candidate vectors.

Step 2.2: Determine whether there is at least one candidate vector among the candidate vectors selected in step 2.1 that does not cause switch transitions between P level and N level, and if yes, perform step 2.4, or otherwise, perform step 2.3.

Step 2.3: Expand a selection range from the triangular sector in which the reference voltage vectors are located to a hexagonal sector in which the reference voltage vectors are located, and perform the operation of step 2.4 on the candidate vectors within the hexagonal sector.

Step 2.4: Directly disqualify candidate vectors that cause switch transitions between P level and N level, and retain other candidate vectors.

Step 2.5: Control the dual three-phase three-level inverter 1.7 based on the candidate vectors determined in step 2.4, acquire six-phase currents at present an instant, and then obtain the dq-axis current values of $i_{d1}^k$, $i_{q1}^k$, $i_{d2}^k$ and $i_{q2}^k$, and predict the values of controlled variables at the next instant, and obtain values of $i_{d1}^{k+1}$, $i_{q1}^{k+1}$, $i_{d2}^{k+1}$, $i_{q2}^{k+1}$ and $V_n^{k+1}$.

Step 2.6: Subsequently determine whether there is a candidate vector under the effect of which the predicted values of controlled variables $i_{d1}$, $i_{q1}$, $i_{d2}$, $i_{q2}$, and $V_n$ at the next instant are all within the error bounds, that is, determine whether there exists an extrapolatable candidate vector, and if yes, perform step 2.7, or otherwise, perform step 2.9.

Step 2.7: Delete candidate vectors unable to be extrapolated, and perform linear extrapolation on the remaining candidate vectors.

Step 2.8: Calculate a switching frequency based on extrapolation results, evaluate the candidate vectors by using the calculated switching frequency as a cost function, and perform step 2.10.

Step 2.9: Evaluate the candidate vectors by using a weighting factor-based cost function where the absolute control errors of the controlled variables are summarized with corresponding weighting factors, and perform step 2.10.

Step 2.10: Obtain a final loaded vector based on the result of step 2.8 or step 2.9.

Figure 3:
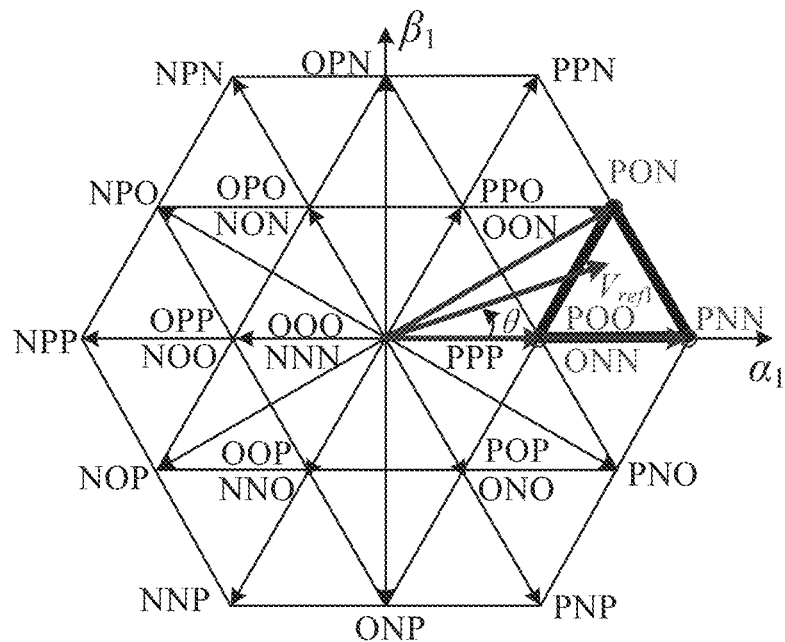
FIG. 3 is a voltage space vector distribution diagram of the first set of three-level inverter in dual three-phase permanent magnet synchronous motor drives and a schematic diagram of candidate vector selection based on the triangular area method, where $V_{ref1}$ is the reference voltage vector corresponding to the first set of windings.
Figure 4:
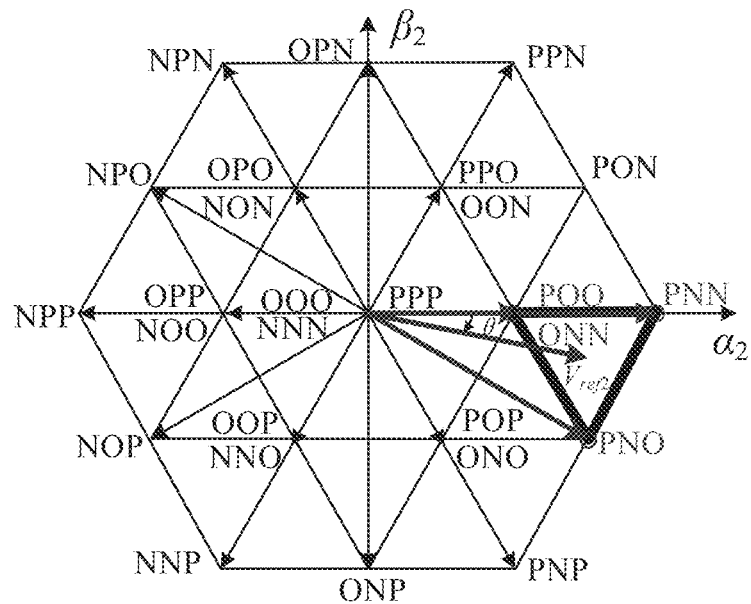
FIG. 4 is a voltage space vector distribution diagram of the second set of three-level inverter in dual three-phase permanent magnet synchronous motor drives and a schematic diagram of candidate vector selection based on the triangular area method, where $V_{ref2}$ is a reference voltage vector corresponding to the second set of windings.

A candidate vector selection based on the triangular area method in the present invention is described in FIG. 3 and FIG. 4. Each leg of the three-level inverter can generate three voltage levels of $U_{dc}/2$, 0, $-U_{dc}/2$, which is represented by symbols P, O, and N respectively. $V_{ref1}$ and $V_{ref2}$ are reference voltage vectors of the first set of windings and the second set of windings, respectively. A triangular area in which $V_{ref1}$ is located includes four vectors: PON, PNN, POO, and ONN. A triangular area in which $V_{ref1}$ is located includes four vectors: ONN, POO, PNN, and PNO. A selection process of the above candidate vectors corresponds to that in step 2.1.

Figure 5:
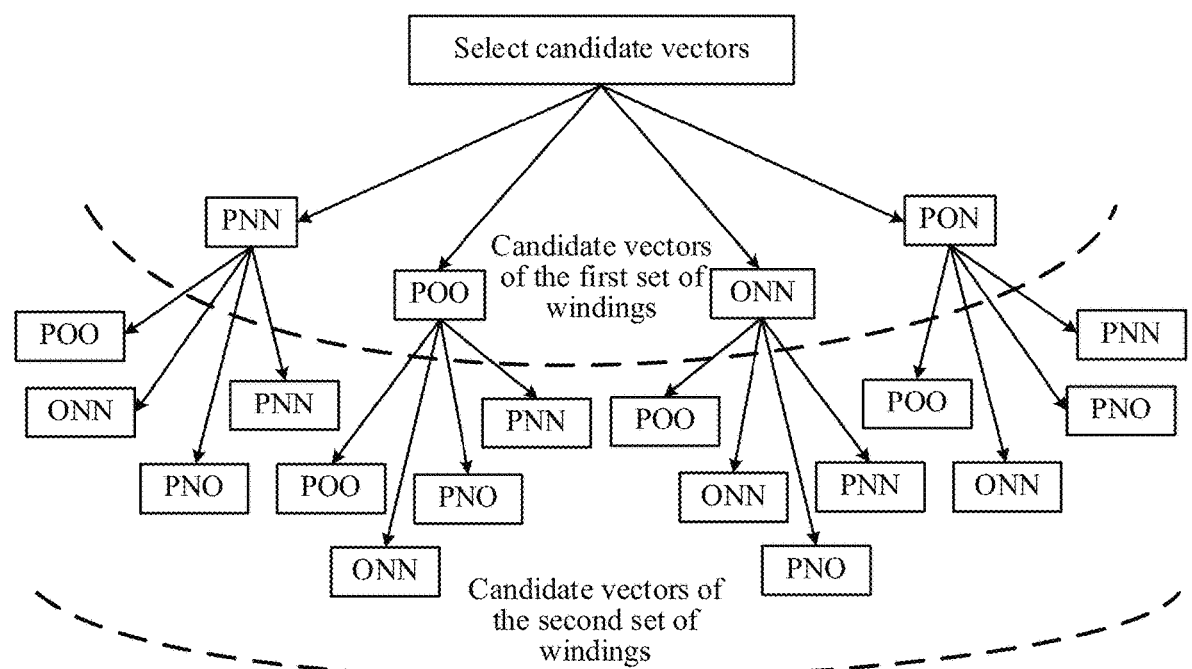
FIG. 5 is a schematic diagram of the intersectional traversal of candidate vectors of a dual three-phase inverter in conventional synchronous control.

The process of intersectional traversal of candidate vectors of the dual three-phase inverter in conventional synchronous control in comparison with the present invention is shown in FIG. 5. Starting from step 2.1, the first set of windings has four options. For each option, the second set of windings has four corresponding options. Therefore, the conventional synchronous control method finally obtains 16 combinations of candidate vectors: {PNN, POO}, {PNN, ONN}, {PNN, PNO}, {PNN, PNN}, {POO, POO}, {POO, ONN}, {POO, PNO}, {POO, PNN}, {ONN, POO}, {ONN, ONN}, {ONN, PNO}, {ONN, PNN}, {PON, POO}, {PON, ONN}, {PON, PNO}, and {PON, PNN}.

Figure 6:
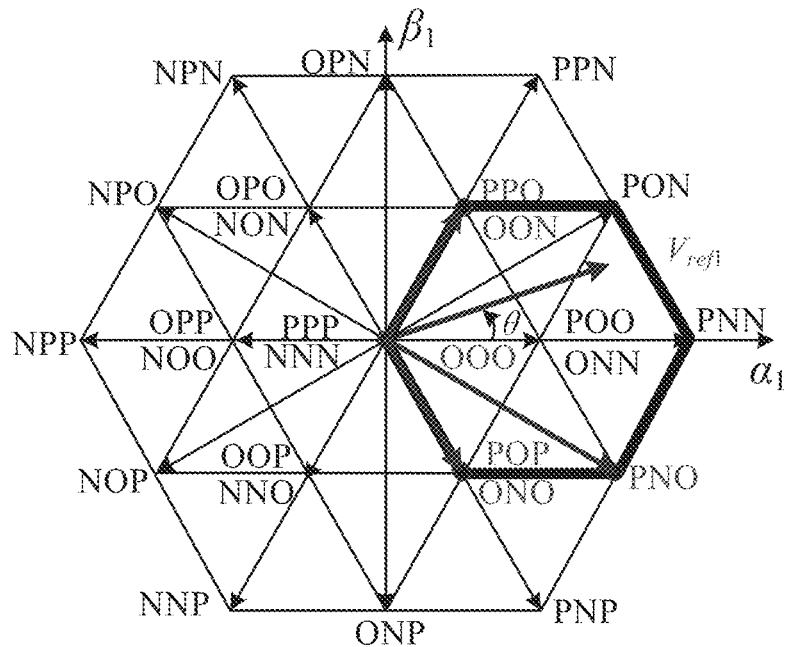
FIG. 6 is a voltage space vector distribution diagram of the first set of three-level inverter in the dual three-phase permanent magnet synchronous motor drives and a schematic diagram of candidate vector selection based on a hexagonal area method.
Figure 7:
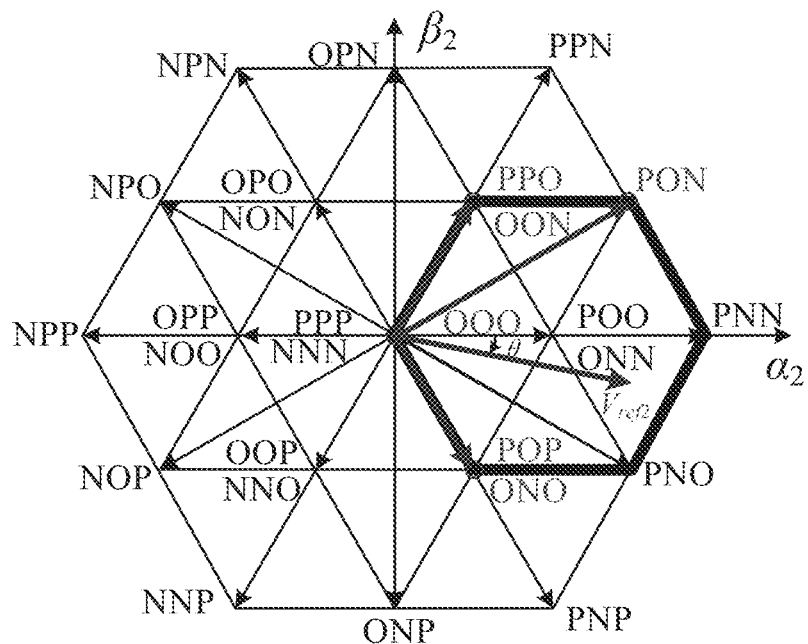
FIG. 7 is the voltage space vector distribution diagram of the second set of three-level inverter in the dual three-phase permanent magnet synchronous motor drives and a schematic diagram of candidate vector selection based on the hexagonal area method.

A candidate vector selection based on the hexagonal area method in the present invention is described in FIG. 6 and FIG. 7. $V_{ref1}$ and $V_{ref2}$ are the reference voltage vectors of the first set of windings and the second set of windings, respectively. Considering that the precondition of using the hexagonal area method is that the triangular area method does not satisfy the condition, vectors located in both the hexagonal area and triangular area should be excluded, and only vectors that are only in the hexagonal area but are not in the triangular area should be retained. For example, when $V_{ref1}$ and $V_{ref2}$ are located at positions shown in FIG. 6 and FIG. 7, respectively, vectors in the hexagonal area in which $V_{ref1}$ is located are PPO, OON, OOO, POP, ONO, PNO, PON, PNN, POO, and ONN. The candidate vectors PON, PNN, POO, and ONN in the triangular area are excluded. Consequently, the final candidate vectors determined by using the hexagonal area method are a total of 6 vectors PPO, OON, OOO, POP, ONO, and PNO. Vectors in the hexagonal area in which $V_{ref2}$ is located are a total of 10 vectors PPO, OON, PON, OOO, POP, ONO, ONN, POO, PNN, and PNO. The candidate vectors ONN, POO, PNN, and PNO in the triangular area in which $V_{ref2}$ is located are excluded. Consequently, the final candidate vectors determined by using the hexagonal area method are a total of 6 vectors PPO, OON, PON, OOO, POP, and ONO.

Figure 8:
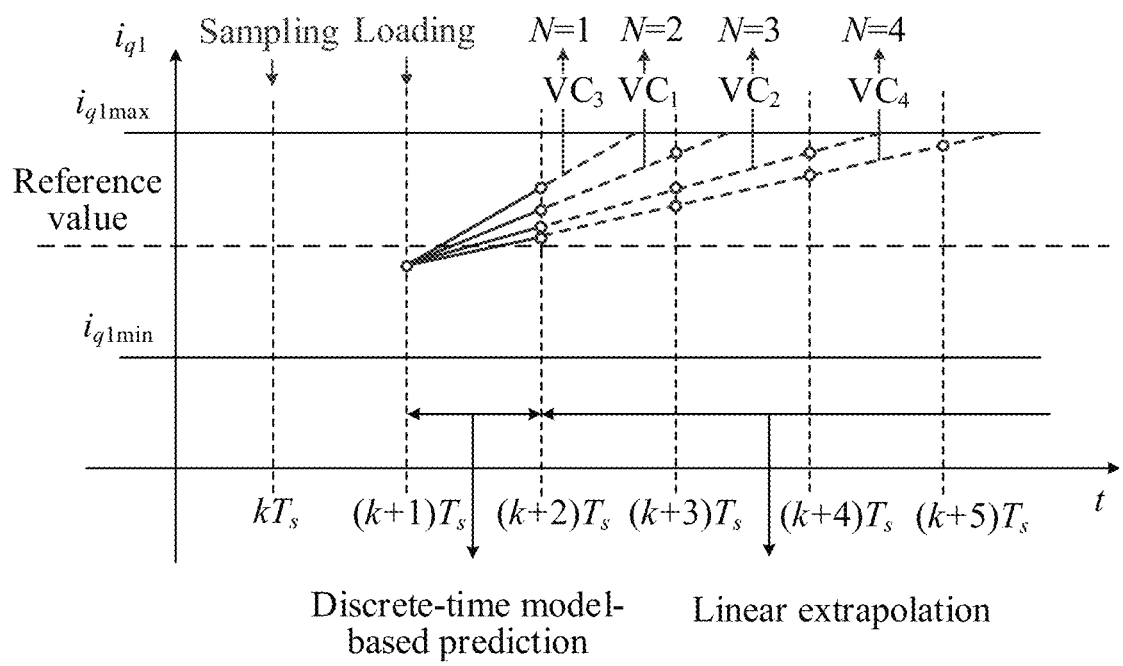
FIG. 8 is an example diagram of multi-step MPC of $q_1$-axis current.

The evaluation method with a candidate vector based on an extrapolation method in the present invention is described in FIG. 8. The predicted and extrapolated trajectories of vectors $VC_3$, $VC_1$, $VC_2$, and $VC_4$ are shown in the four trajectories in FIG. 8. Solid line parts are predicted trajectories based on the discrete-time model. Dashed line parts are linearly extrapolated trajectories. If the predicted value of the variable is within the hysteresis bound, the trajectory extrapolation is able to be conducted to find the length to hit the error bounds, which is defined as the length of extrapolation. For example, extrapolation length of $VC_3$, $VC_1$, $VC_2$, and $VC_4$ with respect to $q_1$-axis current in FIG. 8 are 1, 2, 3, and 4 respectively. To ensure that all controlled variables are within error ranges, for each candidate vector, the smallest value among the extrapolation length of all the controlled variables is selected as a final extrapolation length N for an entire extrapolation process when the candidate vector is used to perform a control procedure. To introduce an evaluation indicator of the switching frequency, the number of commutations is defined for each vector candidate as follows.

$$n_s = \sum_x [S_x(k+1) - S_x(k)], x = a, b, c, d, e, f, \quad (1)$$

where $T_s$ is the sampling period, a script (k) denotes variable values sampled at the instant $kT_s$, and $S_x$ is a switch function, which is defined as:

$$S_x = \begin{cases} 1 & \text{The phase outputs a } P \text{ level} \\ 0 & \text{The phase outputs an } O \text{ level } x \in \{a, b, c, d, e, f\}. \\ -1 & \text{The phase outputs an } N \text{ level} \end{cases} \quad (2)$$

Obviously, when a total extrapolation length is larger and the number of commutations is smaller, a control performance is better and the switching frequency is smaller. Therefore, the cost function is defined as:

$$g_1 = \frac{n_s}{N}. \quad (3)$$

Equation (3) is the cost function in step 2.8. The candidate vector with the smallest value of the cost function is selected as the final loaded vector.

The weighting factor-based cost function where the absolue control errors of the controlled variables are summarized with corresponding weighting factors is shown in Equation (4):

$$g_2 = \sum_x \lambda_x g_x, x \in \{i_{d1}, i_{q1}, i_{d2}, i_{q2}, V_n\} \quad (4)$$

-continued $$g_x = \begin{cases} x(k+2) - x_{max}, & x(k+2) > x_{max} \\ x_{min} - x(k+2), & x(k+2) < x_{min} \\ 0, & x_{min} \leq x(k+2) \leq x_{max} \end{cases}$$

where $\lambda_x$ is a weight coefficient of a variable x, $x_{min}$ and $x_{max}$ are the allowable minimum and maximum value of the variable x, respectively. Subsequently, it gets $x_{min}=x_{ref}-\Delta x$, $x_{max}=x_{ref}+\Delta x$. $\Delta x$ is an allowable absolute error between a predicted value and a reference value of the variable x at a moment $(k+2)T_s$, and $x_{ref}$ is the reference value of the variable x. During the sampling and control procedure of the first set of windings, $x \in \{i_{d1}, i_{q1}, V_n\}$. During sampling and control procedure of the second set of windings, $x \in \{i_{d2}, i_{q2}, V_n\}$. Equation (4) is the cost function in step 2.9. The candidate vector with the smallest value of the cost function is selected as the final loaded vector.

Figure 9:
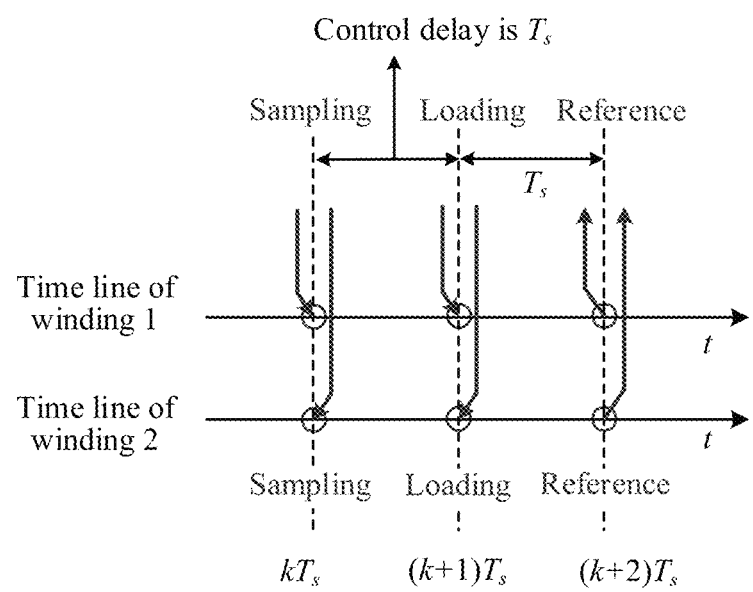
FIG. 9 is a sequence diagram of predictive control of the synchronous predictive control method.
Figure 10:
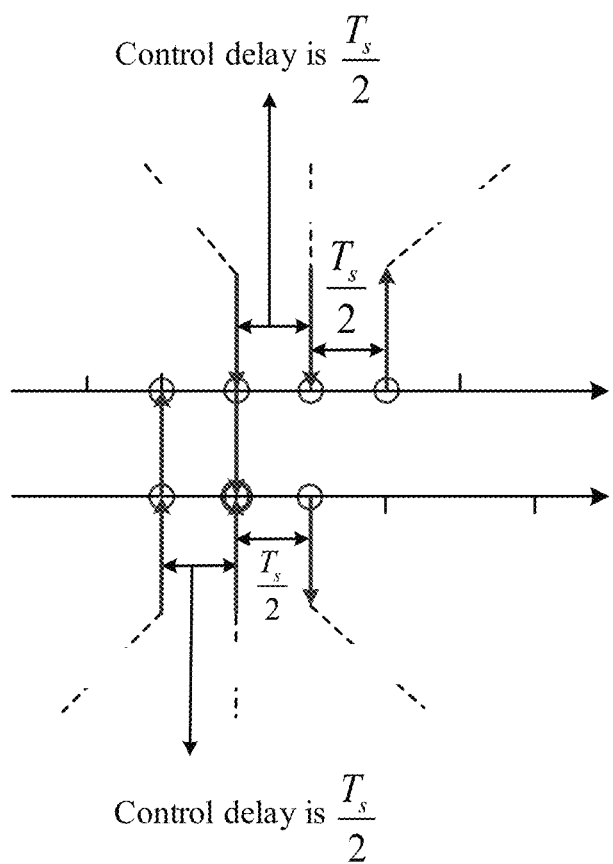
FIG. 10 is a sequence diagram of predictive control of a control method by alternately performing sampling and control procedures.

A sequence diagram of the control method by alternately performing sampling and control procedures for the dual three-phase windings in the present invention is shown in FIG. 9 and FIG. 10. FIG. 9 is a sequence diagram of the synchronous predictive control. Sampling points on the time line of winding 1 and winding 2 represent sampling instants of winding 1 and winding 2 with a synchronous control sequence. Loading points on the time line of winding 1 and winding 2 represent vector loading instants of winding 1 and winding 2 with the synchronous control sequence. Reference tracking points on the time line of the winding 1 and winding 2 are target instants at which currents of winding 1 and winding 2 are expected to follow reference values with the synchronous control sequence. The delay time between a sampling instant and a vector loading instant with the synchronous control sequence is one sampling period. FIG. 10 is a sequence diagram of a control method by alternately performing sampling and control procedures. Sampling points on the time line of winding 1 winding 2 are sampling instants of winding 1 and winding 2 under the sequence of the control method by alternately performing sampling and control procedures. Loading points on the time line of winding 1 and winding 2 are vector loading instants of winding 1 and winding 2 under the sequence of the control method by alternately performing sampling and control procedures. Reference tracking points on the time line of winding 1 and winding 2 are target instants at which the currents of winding 1 and winding 2 are expected to follow reference currents under the sequence of the control method by alternately performing sampling and control procedures. A delay time between sampling and vector loading instants under the sequence of the control method by alternately performing sampling and control procedures is half the sampling period. As shown in FIG. 9, a control strategy in which sampling instants, vector loading instants, and reference tracking instants of the dual windings are simultaneous is called synchronous control. The control strategy in which sampling instants, vector loading instants, the reference tracking instants are interleaved by half of the sampling period is called a control method by alternately performing sampling and control procedures. In the synchronous control, in both sets of windings, sampling is performed at an instant $kT_s$, new switching vectors are loaded at the instant $(k+1)T_s$, and the objective is to track the reference values at the instant $(k+2)T_s$. However, in the control method by alternately performing sampling and control procedures, in the first set of windings, sampling is performed at an instant $(k+1/2)T_s$, new vectors are loaded at the instant $(k+1)T_s$, and the objective is to track the reference values at an instant $(k+3/2)T_s$. In the second set of windings, sampling is performed at the instant $kT_s$, new vectors are loaded at the instant $(k+1/2)T_s$, and the objective is to track the reference values at the instant $(k+1)T_s$. Therefore, the sampling, the loading, and the reference tracking instants of the two sets of windings are staggered by half of the sampling period.

A two-layer MPC strategy in the present invention is shown in Equations (5), (6), (7), and (8). First-layer MPC is embedded in a procedure of selecting candidate vectors based on a deadbeat control. With the objective that $d_1q_1$-axis currents and $d_2q_2$-axis currents track the equally divided reference currents, the reference vector is calculated as shown in Equation (5):

$$\begin{cases} u_{d1}^* = R_s i_{d1}(k+1) + L_d(i_{d1}^* - i_{d1}(k+1))/(T_s/2) - \omega(k)L_{qm}i_{q2}(k+1) + \\ \qquad L_{dm}(i_{d2}^* - i_{d2}(k+1))/(T_s/2) - \omega(k)L_q i_{q1}(k+1) \\ u_{q1}^* = R_s i_{q1}(k+1) + L_q(i_{q1}^* - i_{q1}(k+1))/(T_s/2) + \omega(k)L_{dm}i_{d2}(k+1) + \\ \qquad L_{qm}(i_{q2}^* - i_{q2}(k+1))/(T_s/2) + \omega(k)L_d i_{d1}(k+1) + \omega(k)\psi_f \\ u_{d2}^* = R_s i_{d2}(k+1) + L_d(i_{d2}^* - i_{d2}(k+1))/(T_s/2) - \omega(k)L_{qm}i_{q1}(k+1) + \\ \qquad L_{dm}(i_{d1}^* - i_{d1}(k+1))/(T_s/2) - \omega(k)L_q i_{q2}(k+1) \\ u_{q2}^* = R_s i_{q2}(k+1) + L_q(i_{q2}^* - i_{q2}(k+1))/(T_s/2) + \omega(k)L_{dm}i_{d1}(k+1) + \\ \qquad L_{qm}(i_{q1}^* - i_{q1}(k+1))/(T_s/2) + \omega(k)L_d i_{d2}(k+1) + \omega(k)\psi_f \end{cases} \quad (5)$$

where $i_{d1}^*=i_{d2}^*=(1/2)i_d^*$, $i_{q1}^*=i_{q2}^*=(1/2)i_q^*$, $L_d$ and $L_q$ are d-axis inductance and q-axis inductance, respectively, $u_{d1}^*$, $u_{q1}^*$, $u_{q2}^*$, and $u_{q2}^*$ are dq-axis reference voltages of the two sets of windings, respectively, $R_s$ is a stator resistance, $i_{d1}$, $i_{q1}$, $i_{d2}$, and $i_{q2}$ are dq-axis currents of the two sets of windings, respectively, $L_{dm}$ and $L_{qm}$ are d-axis mutual inductance and q-axis mutual inductance, respectively, $\omega$ is an electric angular speed, and $\psi_f$ is a permanent magnet flux linkage. The objective of the second-layer MPC is to make d-axis total current and q-axis total current of the dual windings follow corresponding reference values obtained by the maximum torque per ampere control module. The sampling instant of winding 1 shown in FIG. 10 is used as an example. The switching state of the second inverter remains unchanged between the sampling instant and a reference tracking instant of winding 1. Therefore, dq-axis voltages $u_{d2}$ and $u_{q2}$ of winding 2 remain unchanged. According to a discrete-time model of the motor, state variables of the motor have the following constraint conditions between the sampling instant and the reference tracking instant of winding 1:

$$\begin{cases} u_{d2} = R_s i_{d2}(k+1) + L_d(i_{d2}(k+3/2) - i_{d2}(k+1))/(T_s/2) + L_{dm}(i_{d1}(k+3/2) - \\ \qquad i_{d1}(k+1))/(T_s/2) - \omega(k)L_q i_{q2}(k+1) - \omega(k)L_{qm}i_{q1}(k+1) \\ u_{q2} = R_s i_{q2}(k+1) + L_q(i_{q2}(k+3/2) - i_{q2}(k+1))/(T_s/2) + L_{qm}(i_{q1}(k+3/2) - \\ \qquad i_{q1}(k+1))/(T_s/2) + \omega(k)L_d i_{d2}(k+1) + \omega(k)\psi_f + \omega(k)L_{dm}i_{d1}(k+1) \end{cases} \quad (6)$$

On the other hand, expressions of the objective of the second-layer MPC are:

$$\begin{cases} i_{d1}(k+3/2) + i_{d2}(k+3/2) = i_d^* \\ i_{q1}(k+3/2) + i_{q2}(k+3/2) = i_q^* \end{cases} \quad (7)$$

According to Equations (6) and (7), reference values of $d_1q_1$-axis currents of winding 1 are solved as shown in Equation (8):

$$\begin{cases} i_{d1}(k+3/2) = (L_d i_{d2}(k+1) + L_{dm} i_{d1}(k+1) - L_d i_d^* + u_{d2} T_s/2 - R_s T_s i_{d2}(k+1)/2 + \\ \qquad \omega(k) L_q T_s i_{q2}(k+1)/2 + \omega(k) L_{qm} T_s i_{q1}(k+1)/2)/(L_{dm} - L_d) \\ i_{q1}(k+3/2) = (L_{qm} i_{q1}(k+1) + L_q i_{q2}(k+1) - T_s \omega(k)\psi_f/2 - L_q i_q^* - R_s T_s i_{q2}(k+1)/2 - \\ \qquad \omega(k) L_d T_s i_{d2}(k+1)/2 - \omega(k) L_{dm} T_s i_{d1}(k+1)/2 + u_{q2} T_s/2)/(L_{qm} - L_q) \end{cases} \quad (8)$$

The reference currents shown in Equation (8) are the reference currents in step 2.8 and step 2.9. Similarly, during sampling and control of the second set of windings, reference values of $d_2q_2$-axis currents of the winding 2 are calculated as follows:

$$\begin{cases} i_{d2}(k+1) = (L_d i_{d1}(k+1/2) + L_{dm} i_{d2}(k+1/2) - L_d i_d^* + u_{d1} T_s/2 - R_s T_s i_{d1}(k+1/2)/2 + \\ \qquad \omega(k) L_q T_s i_{q1}(k+1/2)/2 + a)(k) L_{qm} T_s i_{q2}(k+1/2)/2 \big) / (L_{dm} - L_d) \\ i_{q2}(k+1) = (L_q i_{q1}(k+1/2) + L_{qm} i_{q2}(k+1/2) - T_s \omega(k)\psi_f/2 - L_q i_q^* - R_s T_s i_{q1}(k+1/2)/2 - \\ \qquad \omega(k) L_d T_s i_{d1}(k+1/2)/2 - \omega)(k) L_{dm} T_s i_{d2}(k+1/2)/2 + u_{q1} T_s/2)/(L_{qm} - L_q) \end{cases} \quad (9)$$

It should be noted that in the control method by alternately performing sampling and control procedures, since a switching state of one inverter remains unchanged, the dimensionality of the system is reduced from four dimensions to two dimensions. The state variable dimensionality related to the motor is also reduced from four dimensions to two dimensions. In the present invention, three variables, that is, the dq-axis currents of the sampled windings and DC-link mid-point voltage, are selected as the controlled variables of the control method by alternately performing sampling and control procedures.

Verification results of experiments of the present invention are shown in FIG. 11 to FIG. 21. The experiments are carried out based on a laboratory prototype of the neutral point clamped three-level inverter-fed dual three-phase PMSM drive. The control algorithm is implemented by the DSP TI-TMS320F28346. The control signals for power devices are generated by FPGA Xilinx-Spartan6 XC6SLX25 through a driving circuit. A permanent magnet synchronous generator with the external resistors working as the load is mechanically coupled to the dual three-phase motor. The used parameters of the dual three-phase motor are as follows: The number of pole pairs is 4. The q-axis inductance is 13 mH. The d-axis inductance is 10 mH. The leakage inductance is 5 mH. The permanent magnet flux linkage is 0.08 Wb. The stator resistance is 0.225Ω. The DC-link capacitance is 4000 g. The sampling frequency of a single set of windings is 7.5 kHz.

Figure 11:
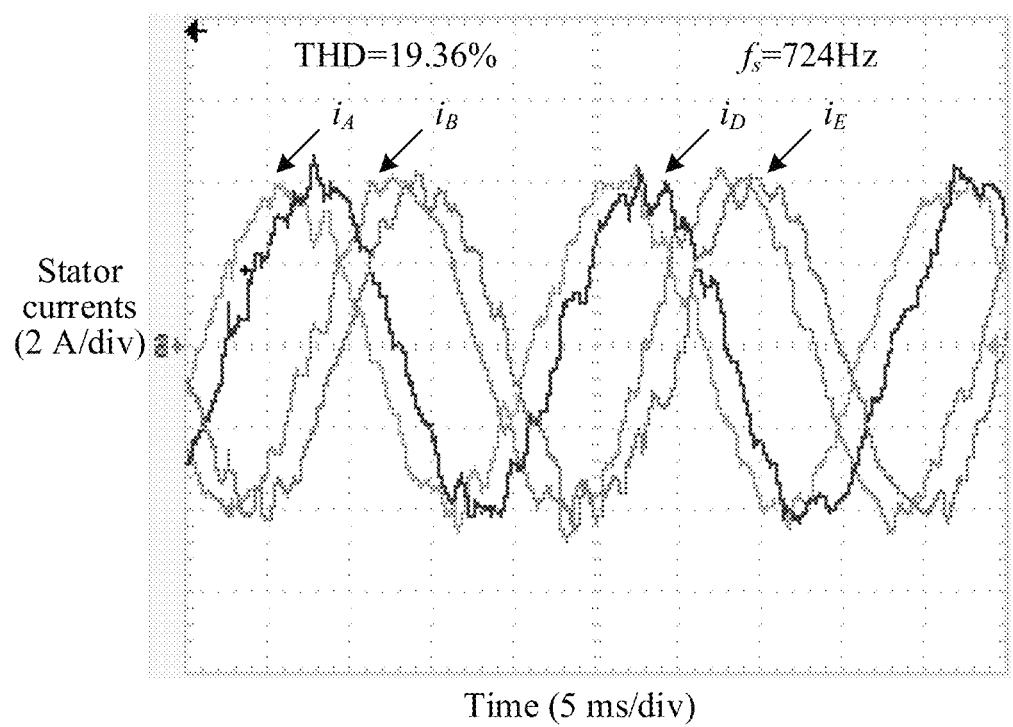
FIG. 11 is experimental waveform diagrams of A-, B-, D-, and E-phase currents of PMSM in a conventional synchronous control method, where $i_A$, $i_B$, $i_D$, and $i_E$ are experimental waveforms of the A-, B-, D-, and E-phase currents of the motor, respectively.
Figure 12:
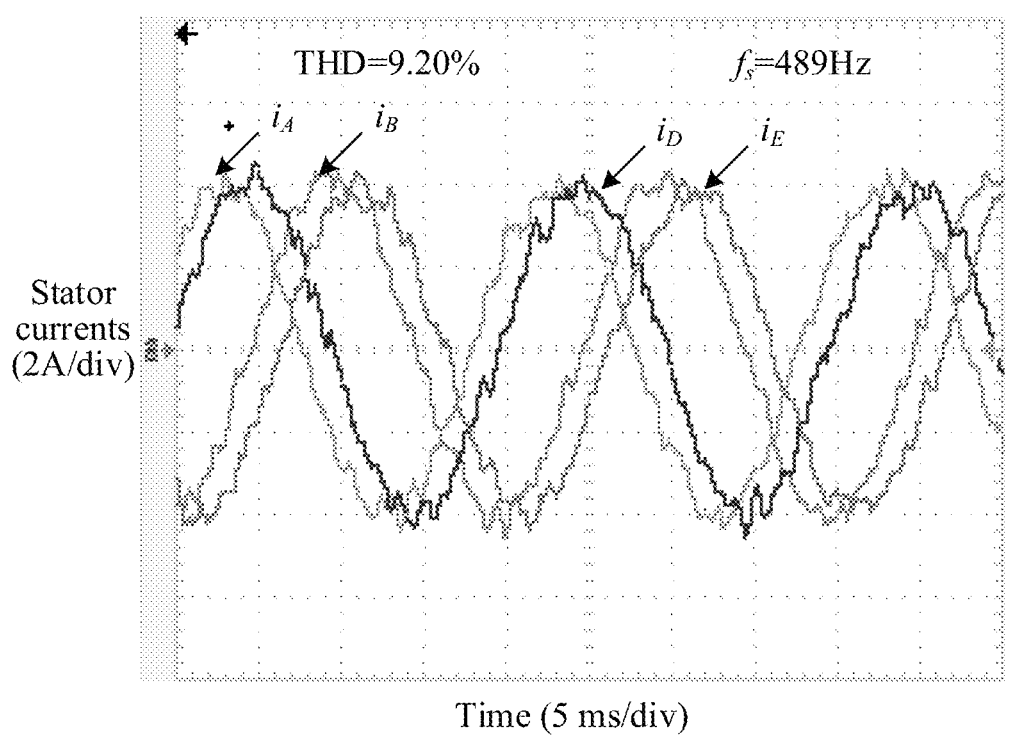
FIG. 12 is experimental waveform diagrams of A-, B-, D-, and E-phase currents of PMSM in the control method by alternately performing sampling and control procedures.
Figure 13:
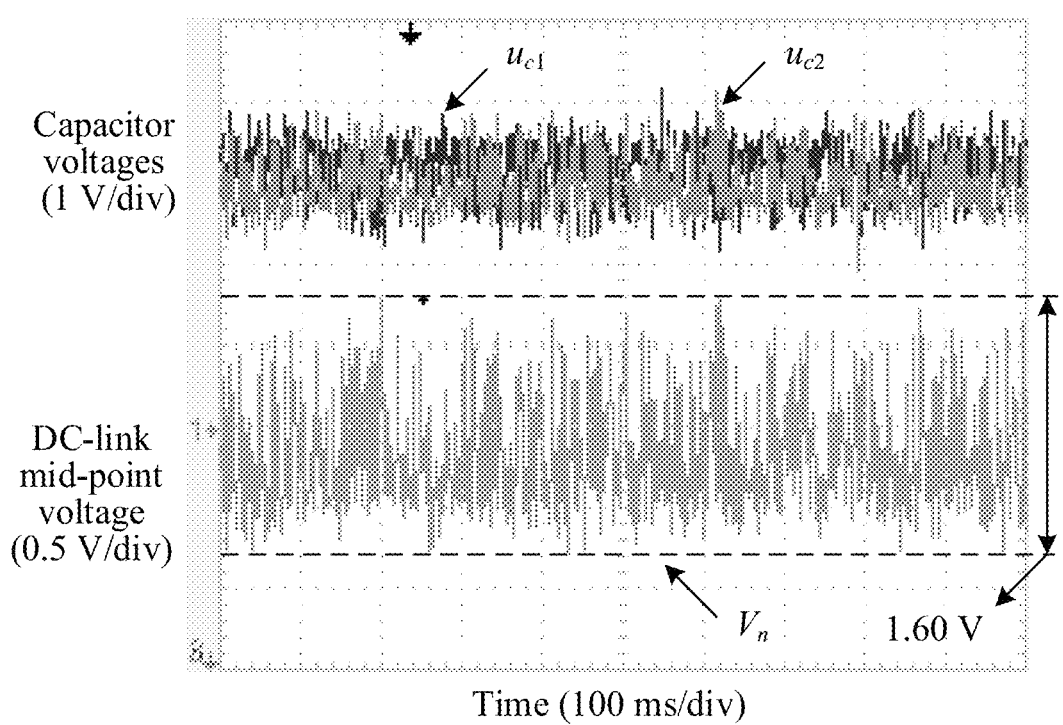
FIG. 13 is experimental waveform diagrams of DC-link capacitor voltages and mid-point voltage in the conventional synchronous control method.
Figure 14:
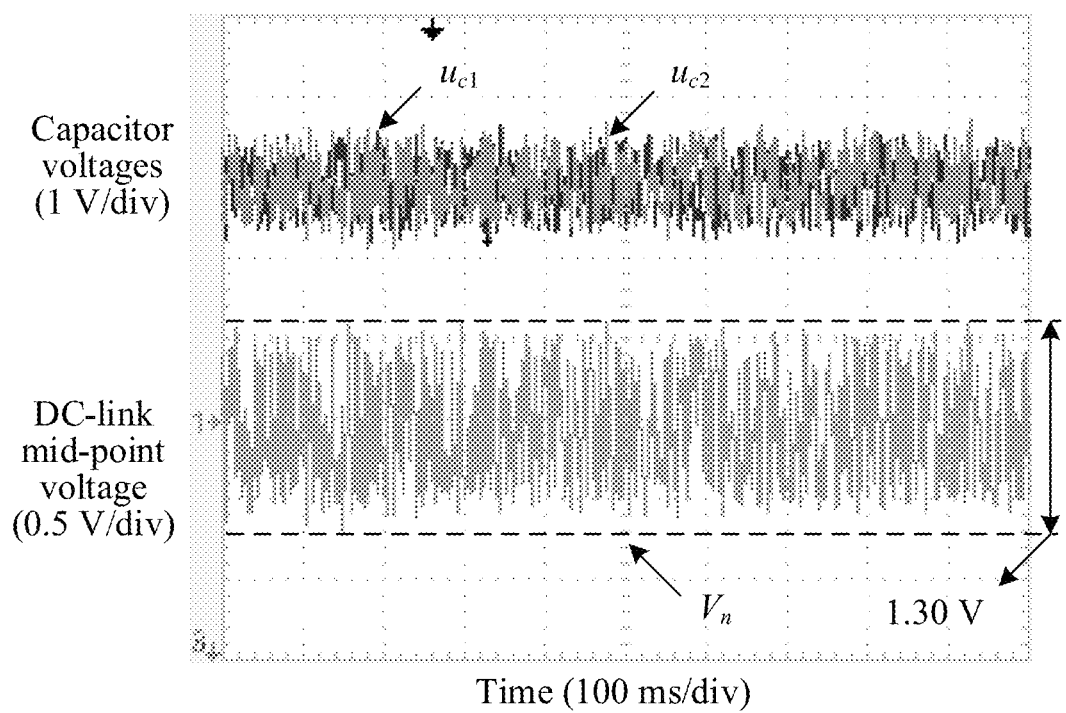
FIG. 14 is experimental waveform diagrams of DC-link capacitor voltages and mid-point voltage in the control method by alternately performing sampling and control procedures.
Figure 15:
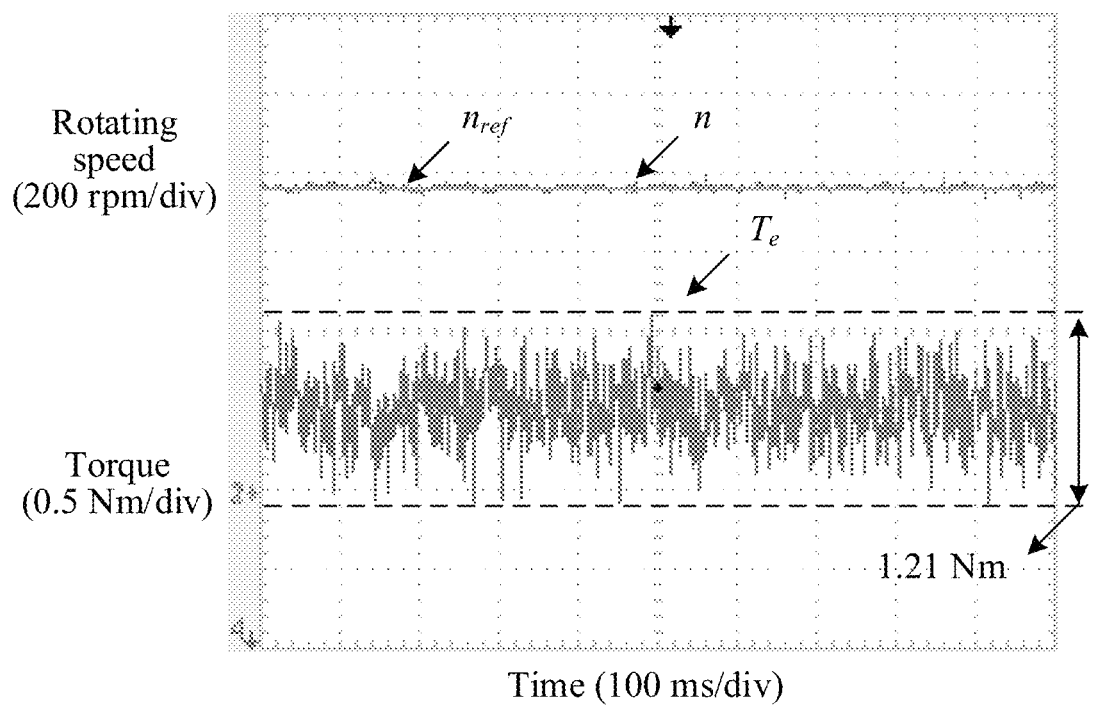
FIG. 15 shows experimental results of speed and torque waveforms in the conventional synchronous control method.
Figure 16:
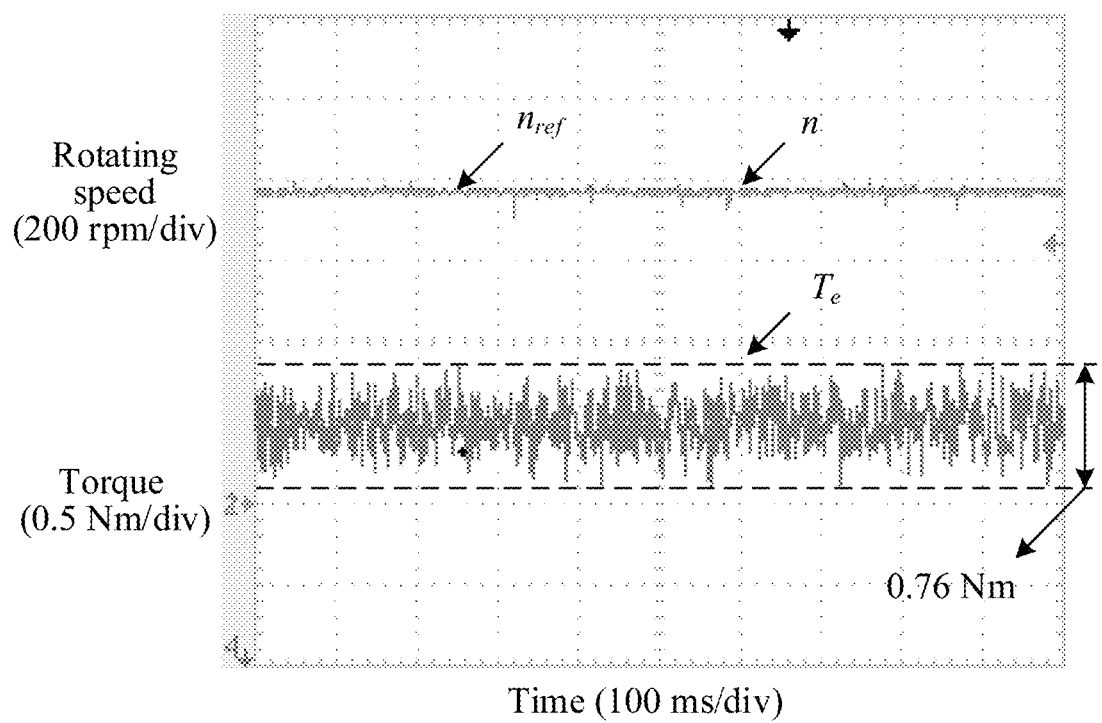
FIG. 16 shows experimental results of speed and torque waveforms in the control method by alternately performing sampling and control procedures.
Figure 17:
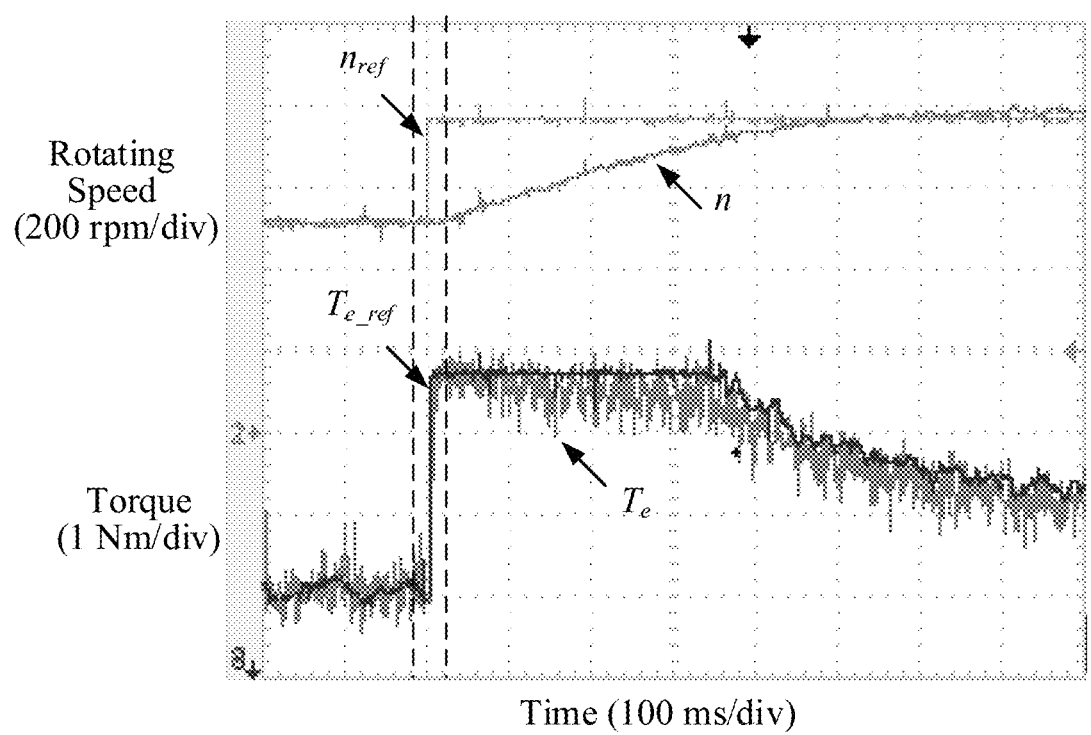
FIG. 17 shows experimental results of dynamic responses of speed and torque waveforms in the conventional synchronous control method.

Experimental results of the control method by alternately performing sampling and control procedures provided in the present invention under the steady state condition are shown in FIG. 11 to FIG. 16, including waveforms of stator currents, waveforms of capacitor voltages, mid-point voltage fluctuation, and waveforms of speed and torque in the conventional synchronous control method and the control method by alternately performing sampling and control procedures. Compared with synchronous control, when the control method by alternately performing sampling and control procedures is used, the current total harmonic distortion (THD) is reduced from 19.36% to 9.20%, the switching frequency is reduced from 724 Hz to 489 Hz, as shown in FIG. 11 and FIG. 12. The mid-point voltage fluctuation range is reduced from 1.6 V to 1.3 V, as shown in FIG. 13 and FIG. 14. $u_{C1}$ and $u_{C2}$ are the upper and lower DC-link capacitor voltages respectively. The torque ripple is reduced from 1.21 Nm to 0.76 Nm, as shown in FIG. 15 and FIG. 16. $n_{ref}$ is the reference speed, and n is the sampled speed. $T_e$ represents the torque of the motor. According to the comparison results in FIG. 11 to FIG. 16, the control method by alternately performing sampling and control procedures improves the steady-state control performance of the dual three-phase PMSM drive system.

Figure 18:
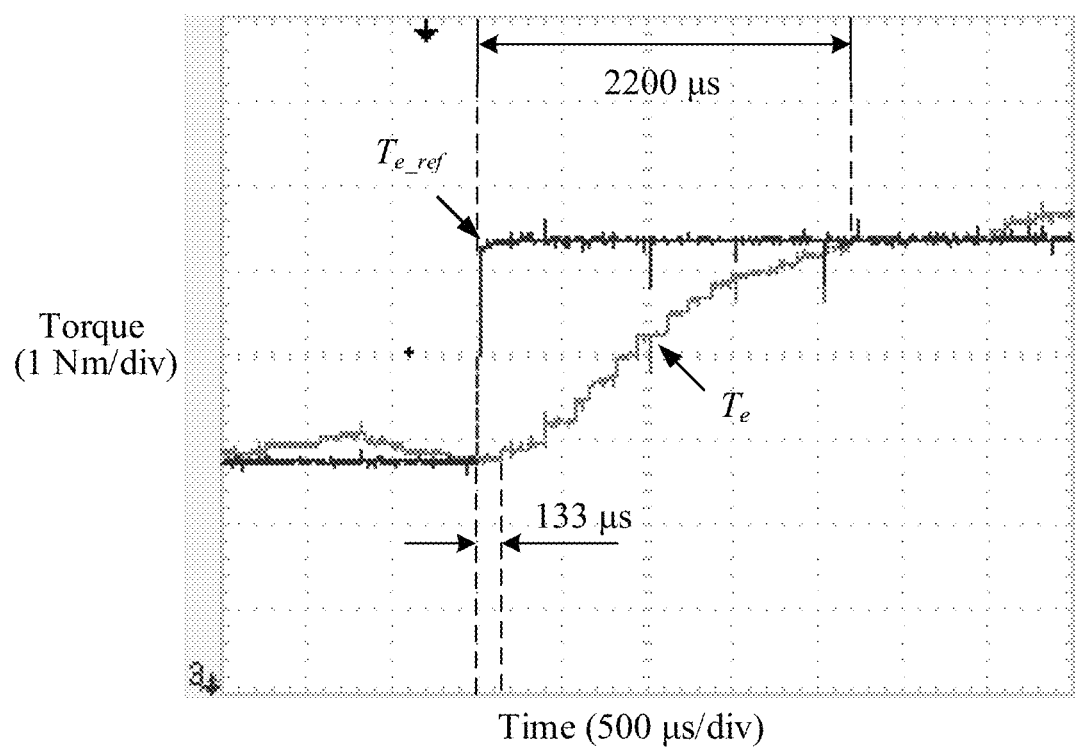
FIG. 18 shows amplified experimental waveforms results of dynamic responses of speed and torque waveforms in the conventional synchronous control method.
Figure 19:
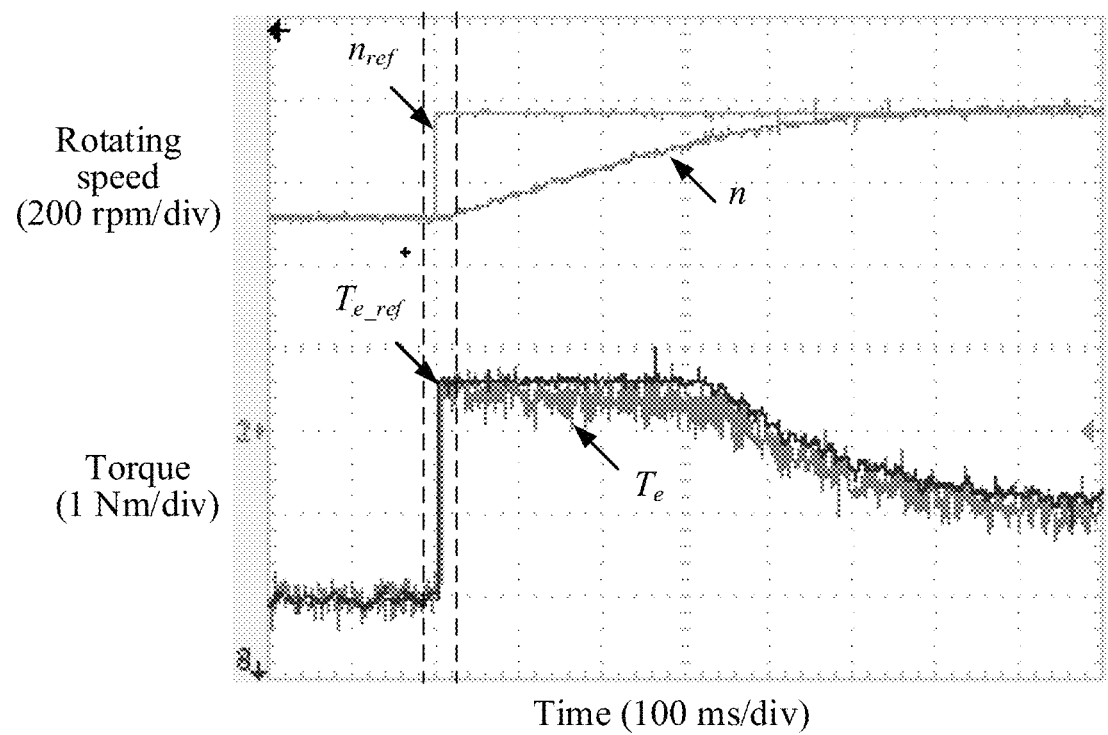
FIG. 19 shows experimental results of dynamic responses of speed and torque waveforms in the control method by alternately performing sampling and control procedures.
Figure 20:
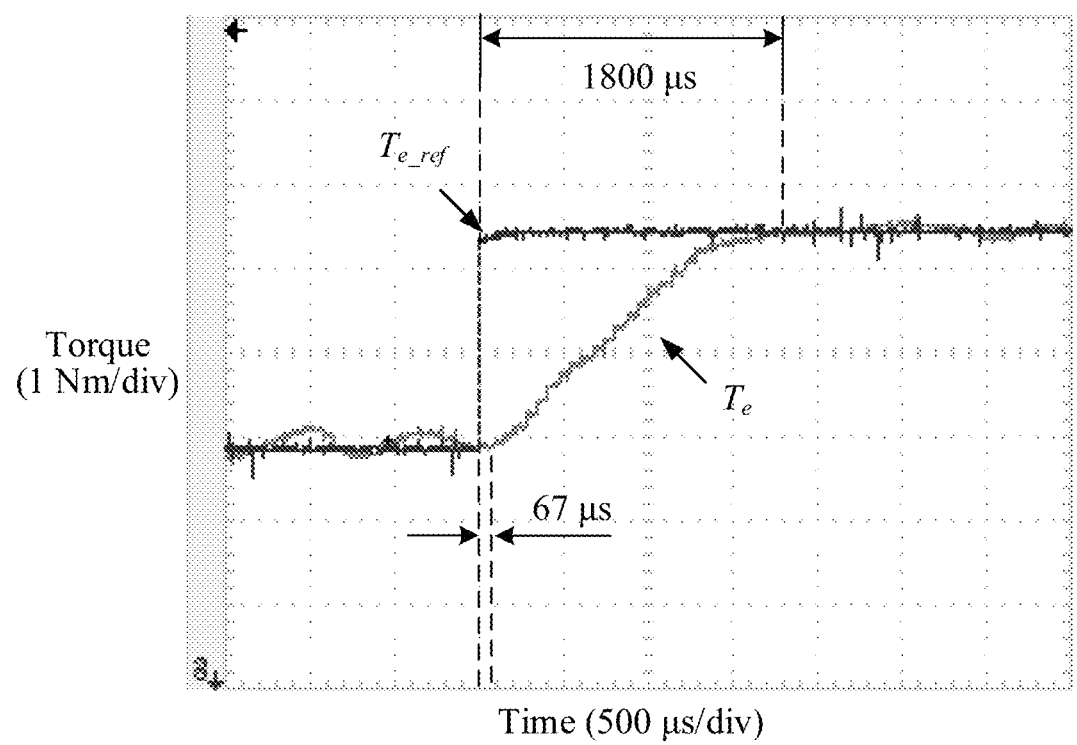
FIG. 20 shows amplified experimental waveforms results of dynamic responses of speed and torque waveforms in the control method by alternately performing sampling and control procedures.

Experimental results of the control method by alternately performing sampling and control procedures provided in the present invention at dynamic operations are shown in FIG. 17 to FIG. 20, including waveforms of speed and torque in the conventional synchronous control method and the control method by alternately performing sampling and control procedures. $T_{e\_ref}$ is torque reference. Compared with synchronous control, when the control method by alternately performing sampling and control procedures is used, the rise delay of the torque is reduced from 133 μs to 67 μs, and the response time of the torque is reduced from 2200 μs to 1800 μs, as shown in FIG. 18 and FIG. 20. According to comparison results in FIG. 17 to FIG. 20, the control method by alternately performing sampling and control procedures effectively improves the dynamic control performance of the dual three-phase PMSM drive system.

Figure 21:
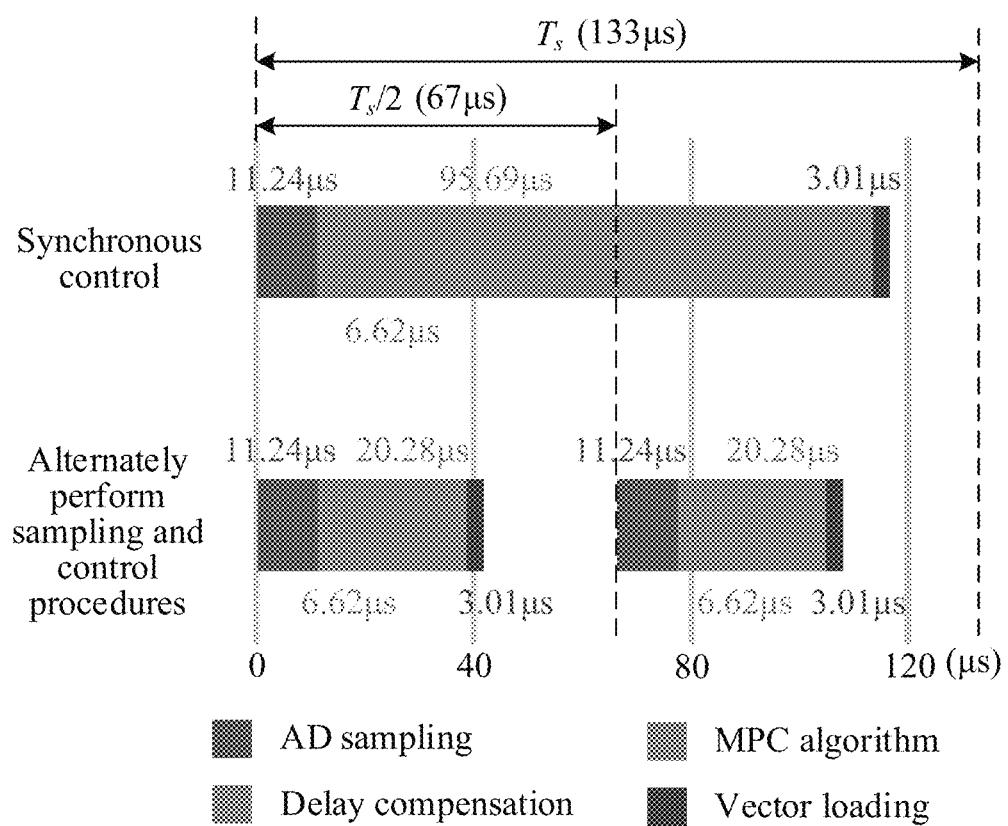
FIG. 21 shows execution time of procedures obtained through experiments in the conventional synchronous control method and the control method by alternately performing sampling and control procedures.

Experimental results in reducing control algorithm complexity of the control method by alternately performing sampling and control procedures provided in the present invention are shown in FIG. 21. The whole execution time includes an analog-to-digital conversion procedure, a delay compensation procedure, an MPC algorithm procedure, and a vector loading procedure in the conventional synchronous control and the control method by alternately performing sampling and control procedures. In the conventional synchronous control, the execution time of the analog-to-digital conversion procedure is 11.24 μs, the execution time of the delay compensation procedure is 6.62 μs, the execution time of the MPC procedure is 95.69 μs, and the execution time of the vector loading procedure is 3.01 μs. In the control method by alternately performing sampling and control procedures, the execution time of the analog-to-digital conversion procedure is 11.24 µs, the execution time of the delay compensation procedure is 6.62 µs, the execution time of the MPC procedure is 20.28 µs, and the execution time of the vector loading procedure is 3.01 µs. During each sampling period, the four procedures are performed twice. The conventional synchronous control and the control method by alternately performing sampling and control procedures have the same execution time of the analog-to-digital conversion procedure, the delay compensation procedure, and the vector loading procedure. However, because the control method by alternately performing sampling and control procedures reduces the dimensionality of the system, the execution time of the MPC algorithm procedure is significantly less than that in the conventional synchronous control. Therefore, during the sampling period of a single set of windings, although analog-to-digital conversion, delay compensation, and vector loading procedures are performed twice in the control method by alternately performing sampling and control procedures, the total execution time of the procedures is still less than that in the conventional synchronous control. According to the comparison results in FIG. 21, it can be concluded that the multi-step MPC scheme with alternately performing sampling and control procedures effectively reduces the computation burden of the algorithm.

What is claimed is:

1. A control method of a dual three-phase permanent magnet synchronous motor by alternately performing sampling and control procedures, comprising: sampling phase currents of a second set of windings at an instant $kT_s$, sampling phase currents of a first set of windings and loading control vectors of the second set of windings at an instant $(k+1/2)T_s$, loading control vectors of the first set of windings and completing tracking of reference values of currents by the second set of windings at an instant $(k+1)T_s$, completing tracking of reference values of currents at an instant $(k+3/2)T_s$ by the first set of windings, using a two-layer MPC strategy with an objective that d-axis total current is equally divided for d-axis currents of two sets of windings, q-axis total current is equally divided for q-axis currents of the two sets of windings, and the d-axis total current and the q-axis total current follow the reference values, to determine a reference value of the d-axis current and a reference value of the q-axis current of each set of windings, selecting candidate vectors that do not cause switch transitions between P level and N level under a constraint of the reference values of the d-axis and q-axis currents, and calculating cost functions for the evaluation of candidate vectors to obtain the candidate vector with the smallest cost function as a final loaded vector, wherein k is a positive integer, and $T_s$ is the switching period.

2. The control method of a dual three-phase permanent magnet synchronous motor by alternately performing sampling and control procedures according to claim 1, wherein a method with selecting candidate vectors that do not cause switch transitions between P level and N level under a constraint of the reference value of the d-axis and q-axis current is:

deleting candidate vectors unable to be extrapolated when there exists at least one candidate vector, during extrapolation of which all the controlled variables are within the ranges of error bounds, and using average switching frequency calculated according to an extrapolation result as a cost function; and using a weighting factor-based cost function where the absolue control errors of the controlled variables are summarized with corresponding weighting factors when all candidate vectors are unable to be extrapolated.

3. The control method of a dual three-phase permanent magnet synchronous motor by alternately performing sampling and control procedures according to claim 2, wherein the expression of calculating the switching frequency is $g_1=n_s/N$, $g_1$ is the switching frequency, $n_s$ is the number of commutations defined for each vector candidate, N is the extrapolation length, $$n_s = \sum_x [S_x(k+1) - S_x(k)],$$

$S_x(k+1)$ and $S_x(k)$ are switch functions of phase x at the instant $(k+1)T_s$ and the instant $kT_s$, respectively, x=a, b, c, d, e, f, and $$S_x = \begin{cases} 1 & \text{□the } x \text{ phase outputs } P \text{ level} \\ 0 & \text{□the } x \text{ phase outputs } O \text{ level} \\ -1 & \text{□the } x \text{ phase outputs } PN \text{ level} \end{cases}.$$

4. The control method of a dual three-phase permanent magnet synchronous motor by alternately performing sampling and control procedures according to claim 2, wherein the expression of weighting factor-based cost function where the absolue control errors of the controlled variables are summarized with corresponding weighting factors is:

$$g_2 = \sum_x \lambda_x g_x,$$

$g_x$ is an absolute value of the control error of variable x, $\lambda_x$ is the weight coefficient of $g_x$, $$g_x = \begin{cases} x(k+2) - x_{max}, & x(k+2) > x_{max} \\ x_{min} - x(k+2), & x(k+2) < x_{min} \\ 0, & x_{min} \le x(k+2) \le x_{max} \end{cases},$$

$x(k+2)$ is the predicted value of the controlled variable x at an instant $(k+2)T_s$, $x_{min}$ and $x_{max}$ are the allowable minimum and maximum value of the variable x, respectively, $x_{max}=x_{ref}+\Delta x$, $x_{min}=x_{ref}-\Delta x$, $\Delta x$ is the allowable absolute error of the variable x, and $x_{ref}$ is the reference value of the variable x; $i_{d1}$ and $i_{q1}$ are respectively the d-axis current and the q-axis current of the first set of windings, $i_{d2}$ and $i_{q2}$ are respectively the d-axis current and the q-axis current of the second set of windings, and $V_n$ is a DC-link mid-point voltage of the inverter; during the sampling and control procedure of the first set of windings, x∈{$i_{d1}$, $i_{q1}$, $V_n$}, during the sampling and control procedure of the second set of windings, x∈{$i_{d2}$, $i_{q2}$, $V_n$}.

5. The control method of a dual three-phase permanent magnet synchronous motor by alternately performing sampling and control procedures according to claim 1, wherein a method with selecting candidate vectors that do not cause switch transitions between P level and N level is: calculating d-axis and q-axis reference voltages of one set of windings according to the reference values of the d-axis and q-axis currents of the two sets of windings, performing polar coordinate transformation on the d-axis and q-axis reference voltages of the set of windings, and selecting vectors in a triangular sector in which the reference voltage vector of the inverter corresponding to the set of windings is located as candidate vectors according to a result of the polar coordinate transformation, wherein when at least one candidate vector does not cause switch transitions between P level and N level, all candidate vectors that do not cause switch transitions between P level and N level are determined to be the final candidate vectors, and when candidate vectors in triangular sectors cause switch transitions between P level and N level, the triangular sector is expanded to a hexagonal sector, vectors located in both the triangular sector and the hexagonal sector in which a reference voltage vector of the inverter corresponding to the set of windings are excluded, and the remaining vectors in the hexagonal area are candidate vectors, determine candidate vectors that do not cause switch transitions between P level and N level as the final candidate vectors.

6. The control method of a dual three-phase permanent magnet synchronous motor by alternately performing sampling and control procedures according to claim 1, wherein reference voltages with the objective that the d-axis total current is equally divided for the d-axis currents of two sets of windings and the q-axis total current is equally divided for the q-axis currents of the two sets of windings are:

$$\begin{cases} u_{d1}^* = R_s i_{d1}(k+1) + L_d(i_{d1}^* - i_{d1}(k+1))/(T_s/2) - \omega(k)L_{qm}i_{q2}(k+1) + \\ \qquad L_{dm}(i_{d2^*} - i_{d2}(k+1))/(T_s/2) - \omega(k)L_q i_{q1}(k+1) \\ u_{q1}^* = R_s i_{q1}(k+1) + L_q(i_{q1}^* - i_{q1}(k+1))/(T_s/2) + \omega(k)L_{dm}i_{d2}(k+1) + \\ \qquad L_{qm}(i_{q2^*} - i_{q2}(k+1))/(T_s/2) + \omega(k)L_d i_{d1}(k+1) + \omega(k)\psi_f \\ u_{d2}^* = R_s i_{d2}(k+1) + L_d(i_{d2}^* - i_{d2}(k+1))/(T_s/2) - \omega(k)L_{qm}i_{q1}(k+1) + \\ \qquad L_{dm}(i_{d1}^* - i_{d1}(k+1))/(T_s/2) - \omega(k)L_q i_{q2}(k+1) \\ u_{q2}^* = R_s i_{q2}(k+1) + L_q(i_{q2}^* - i_{q2}(k+1))/(T_s/2) + \omega(k)L_{dm}i_{d1}(k+1) + \\ \qquad L_{qm}(i_{q1}^* - i_{q1}(k+1))/(T_s/2) + \omega(k)L_d i_{d2}(k+1) + \omega(k)\psi_f \end{cases}$$

wherein $u_{d1}^*$, $u_{q1}^*$, $u_{d2}^*$, and $u_{q2}^*$ are respectively d-axis reference voltages and q-axis reference voltages of the two sets of windings, $i_{d1}^*=i_{d2}^*=(1/2)i_d^*$, $i_{q1}^*=i_{q2}^*=(1/2)i_q^*$, $i_{d1}^*$, $i_{q1}^*$, $i_{d2}^*$, and $i_{q2}^*$ are d-axis reference currents and q-axis reference currents of the two sets of windings, respectively, $i_d^*$ and $i_q^*$ are d-axis total reference current and q-axis total reference current, respectively, $i_{d1}(k+1)$, $i_{q1}(k+1)$, $i_{d2}(k+1)$, and $i_{q2}(k+1)$ are the d-axis currents and the q-axis currents of the two sets of windings at an instant $(k+1)T_s$, respectively, $L_d$ and $L_q$ are d-axis inductance and q-axis inductance, respectively, $R_s$ is stator resistance, $L_{dm}$ and $L_{qm}$ are d-axis mutual inductance and q-axis mutual inductance, respectively, $\omega(k)$ is an electric angular speed at an instant $kT_s$, and $\psi_f$ is a permanent magnet flux linkage.

7. The control method of a dual three-phase permanent magnet synchronous motor by alternately performing sampling and control procedures according to claim 6, wherein the current reference values of the first set of windings with an objective that the d-axis total current and the q-axis total current follow the reference values are:

$$\begin{cases} i_{d1}(k+3/2) = (L_d i_{d2}(k+1) + L_{dm}i_{d1}(k+1) - L_d i_d^* + u_{d2}T_s/2 - R_s T_s i_{d2}(k+1)/2 + \\ \qquad \omega(k)L_q T_s i_{q2}(k+1)/2 + \omega(k)L_{qm}T_s i_{q1}(k+1)/2)/(L_{dm} - L_d) \\ i_{q1}(k+3/2) = (L_{qm}i_{q1}(k+1) + L_q i_{q2}(k+1) - T_s\omega(k)\psi_f/2 - L_q i_q^* - R_s T_s i_{q2}(k+1)/2 - \\ \qquad \omega(k)L_d T_s i_{d2}(k+1)/2 - \omega(k)L_{dm}T_s i_{d1}(k+1)/2 + u_{q2}T_s/2)/(L_{qm} - L_q) \end{cases},$$

and expressions of the current reference values of the second set of windings with the objective that the d-axis total current and the q-axis total current follow the reference values are:

$$\begin{cases} i_{d2}(k+1) = (L_d i_{d1}(k+1/2) + L_{dm}i_{d2}(k+1/2) - L_d i_d + u_{d1}T_s/2 - R_s T_s i_{d1}(k+1/2)/2 + \\ \qquad \omega(k)L_q T_s i_{q1}(k+1/2)/2 + \omega(k)L_{qm}T_s i_{q2}(k+1/2)/2)/(L_{dm} - L_d) \\ i_{q2}(k+1) = (L_q i_{q1}(k+1/2) + L_{qm}i_{q2}(k+1/2) - T_s\omega(k)\psi_f/2 - L_q i_q - R_s T_s i_{q1}(k+1/2)/2 - \\ \qquad \omega(k)L_d T_s i_{d1}(k+1/2)/2 - \omega(k)L_{dm}T_s i_{d2}(k+1/2)/2 + u_{q1}T_s/2)/(L_{qm} - L_q) \end{cases},$$

wherein $i_{d1}(k+3/2)$ and $i_{q1}(k+3/2)$ are the d-axis and q-axis currents of the first set of windings at an instant $(k+3/2)T_s$, respectively, and $i_{d2}(k+1)$ and $i_{q2}(k+1)$ are the d-axis and q-axis currents of the second set of windings at an instant $(k+1)T_s$, respectively.

8. A system for implementing the control method of a dual three-phase permanent magnet synchronous motor according to claim 1, comprising:

a position encoder, mounted on an output shaft of the dual three-phase permanent magnet synchronous motor, and configured to detect the angular position of the motor;

a speed calculation module, wherein the input end of the speed calculation module is the angle position, and the speed calculation module is configured to output the rotating speed;

a PI controller used in the closed-loop speed control, wherein the input end of the speed PI controller receives the speed and the reference value of the rotating speed, and the speed PI controller is configured to generate the torque reference value according to a difference between the rotating speed and the reference value of the rotating speed;

a maximum torque per ampere control module, wherein the input end of the maximum torque per ampere control module receives the reference value of the torque, and the maximum torque per ampere control module is configured to output the reference value of d-axis and q-axis current of the two sets of three-phase windings;

a dual synchronous coordinate transformation module, configured to: receive six-phase currents sampled from the dual three-phase permanent magnet synchronous motor, and output the d-axis and q-axis currents of the two sets of windings at an instant $kT_s$;

a current prediction module, wherein the input end of the current prediction module is connected to the output end of the dual synchronous coordinate transformation module, and the current prediction module is configured to predict the d-axis and q-axis currents of the two sets of windings and the DC-link mid-point voltage at an instant $(k+1)T_s$;

a discrete-time motor model-based deadbeat control module, wherein the input end is connected to the output end of the current prediction module, another input end is connected to the output end of the maximum torque per ampere control module, and the discrete-time motor model-based deadbeat control module is configured to calculate and then output d-axis and q-axis reference voltages of the two sets of windings;

a polar coordinate transformation module, wherein the input end of the polar coordinate transformation module is connected to the output end of the discrete-time motor model-based deadbeat control module, and the polar coordinate transformation module is configured to perform polar coordinate transformation on the d-axis and q-axis reference voltages of the two sets of three-phase windings and the d-axis reference voltage and the q-axis reference voltage of the second set of windings; and a multi-step MPC module, configured to: sample phase currents of the second set of windings at the instant $kT_s$, sample phase currents of the first set of windings and load control vectors of the second set of windings at an instant $(k+1/2)T_s$, load control vectors of the first set of windings and complete tracking of the reference values of the currents by the second set of windings at the instant $(k+1)T_s$, complete tracking of the reference values of the currents by the first set of windings at an instant $(k+3/2)T_s$, use a two-layer MPC strategy with an objective that d-axis total current is equally divided for d-axis currents of two sets of windings, q-axis total current is equally divided for q-axis currents of the two sets of windings, and the d-axis total current and the q-axis total current follow the reference values, to determine a reference value of the d-axis current and a reference value of the q-axis current of each set of windings, select candidate vectors that do not cause switch transitions between P level and N level under a constraint of the reference values of the d-axis and q-axis currents, and calculating cost functions for the evaluation of candidate vectors to obtain a candidate vector with the smallest cost function as a final loaded vector.

9. The system for implementing the control method of a dual three-phase permanent magnet synchronous motor according to claim 8, wherein the multi-step MPC module stores a computer program, and the computer program, when being executed by a processor, implements the control method with controlling the dual three-phase permanent magnet synchronous motor by alternately performing the sampling and control procedures.

* * * * *